(12) United States Patent
Plestid et al.

(10) Patent No.: US 9,918,267 B2
(45) Date of Patent: Mar. 13, 2018

(54) MITIGATION OF RADIO INTERFERENCE AND THERMAL ISSUES USING RADIO ACCESS TECHNOLOGY SELECTION

(71) Applicant: BlackBerry Limited, Waterloo (CA)

(72) Inventors: Thomas Leonard Plestid, Ottawa (CA); Mahesh Narayanan, Ottawa (CA); Stephen John Barrett, Curridge (GB); Richard Charles Burbidge, Hook (GB)

(73) Assignee: BlackBerry Limited, Waterloo, Ontario (CA)

( * ) Notice: Subject to any disclaimer, the term of this patent is extended or adjusted under 35 U.S.C. 154(b) by 176 days.

(21) Appl. No.: 13/934,460

(22) Filed: Jul. 3, 2013

(65) Prior Publication Data
US 2015/0011211 A1    Jan. 8, 2015

(51) Int. Cl.
*H04B 1/00* (2006.01)
*H04W 36/24* (2009.01)
*H04W 48/14* (2009.01)

(52) U.S. Cl.
CPC ............ *H04W 36/24* (2013.01); *H04W 48/14* (2013.01)

(58) Field of Classification Search
USPC ......... 455/418, 419, 432.1, 435.2–437, 41.2, 455/500–501, 527, 67.11; 370/331, 332, 370/334
See application file for complete search history.

(56) References Cited

U.S. PATENT DOCUMENTS

| | | | | |
|---|---|---|---|---|
| 6,760,311 B1* | 7/2004 | Raith | ...................... | H04B 1/036 370/252 |
| 7,689,173 B2* | 3/2010 | Ihm | ........................ | H04B 7/264 370/342 |
| 8,238,863 B2* | 8/2012 | Farmer | ................. | G01S 5/0215 455/226.3 |
| 8,340,580 B1* | 12/2012 | Epstein | ................ | H04B 1/1027 455/114.2 |
| 8,644,190 B2* | 2/2014 | Sachs | ..................... | H04W 48/18 370/254 |
| 2008/0080457 A1* | 4/2008 | Cole | ................... | H04L 12/5692 370/342 |
| 2009/0262785 A1* | 10/2009 | Wilhelmsson | ........ | H04W 16/14 375/133 |

(Continued)

FOREIGN PATENT DOCUMENTS

| CA | 2234758 | 4/1998 |
|---|---|---|
| EP | 2822338 A1 | 1/2015 |

(Continued)

OTHER PUBLICATIONS

Yujian Zhang (U.S. Appl. No. 61/721,436), Advanced Wireless Communication System and Techniques, Nov. 1, 2012, 145 pages.*

(Continued)

*Primary Examiner* — Dai A Phuong
(74) *Attorney, Agent, or Firm* — Fish & Richardson P.C.

(57) ABSTRACT

A wireless UE device uses a method of radio technology and channel selection for transferring device traffic that includes detecting, at a wireless user equipment device, a condition related to at least one of temperature and radio interference and responsive to the detecting, determining to associate a data application on the wireless UE device with a radio access technology (RAT).

17 Claims, 4 Drawing Sheets

(56) References Cited

U.S. PATENT DOCUMENTS

| | | | | |
|---|---|---|---|---|
| 2010/0061313 | A1* | 3/2010 | Park | H04W 4/20 370/329 |
| 2010/0173657 | A1* | 7/2010 | Gao | H04L 12/5855 455/466 |
| 2010/0197235 | A1* | 8/2010 | Wilhelmsson | H04W 72/02 455/63.3 |
| 2010/0323743 | A1* | 12/2010 | Huan | H04W 52/367 455/522 |
| 2012/0002536 | A1* | 1/2012 | Bellur et al. | 370/217 |
| 2012/0087341 | A1* | 4/2012 | Jang | H04W 72/1215 370/331 |
| 2012/0129517 | A1 | 5/2012 | Fox et al. | |
| 2012/0207040 | A1* | 8/2012 | Comsa | H04W 72/1215 370/252 |
| 2013/0035041 | A1* | 2/2013 | Sen | H04B 15/00 455/63.3 |
| 2013/0210364 | A1* | 8/2013 | Mayor | H04B 1/3805 455/63.1 |
| 2014/0017990 | A1* | 1/2014 | Kakadia | H04W 36/14 455/7 |
| 2014/0274078 | A1* | 9/2014 | Hyde | H04W 16/18 455/446 |
| 2014/0355471 | A1* | 12/2014 | Lee | H04W 24/10 370/252 |
| 2014/0369187 | A1* | 12/2014 | Sang | H04L 47/14 370/229 |
| 2015/0105122 | A1* | 4/2015 | Wei | H04W 24/04 455/553.1 |
| 2015/0133182 | A1* | 5/2015 | Tokgoz | H04W 52/243 455/522 |
| 2015/0382249 | A1* | 12/2015 | Jang | H04W 36/20 455/436 |
| 2016/0050679 | A1* | 2/2016 | Desai | H04L 5/0032 375/132 |
| 2016/0112880 | A1* | 4/2016 | Zhang | H04W 76/025 370/254 |
| 2016/0205581 | A1* | 7/2016 | Lee | H04W 72/1215 370/311 |
| 2016/0286473 | A1* | 9/2016 | Huang | H04W 48/16 |
| 2016/0323902 | A1* | 11/2016 | Wu | H04W 72/0406 |

FOREIGN PATENT DOCUMENTS

| | | |
|---|---|---|
| WO | 2004008793 A1 | 1/2004 |
| WO | 2011022504 A1 | 2/2011 |
| WO | 2011123841 A1 | 10/2011 |
| WO | 2015/000073 A1 | 1/2015 |

OTHER PUBLICATIONS

ISA, International Search Report and Written Opinion, Application No. PCT/CA2014/050622, dated Jul. 23, 2014, 9 pgs.

ETSI TS 124 312 V11.6.0, Universal Mobile Telecommunications System (UMTS); LTE; Access Network Discovery and Selection Function (ANDSF) Management Object (MO) (3GPP TS 24.312 version 11.6.0 Release 11); Apr. 2013, 176 pgs.

EPO, Extended European Search Report, Application No. 13174957.4, dated Jan. 8, 2014, 10 pgs.

EPO, Notification of European publication number and information on the application Article 67(3) EPC, Application No. 13174957.4, dated Dec. 10, 2014, 2 pgs.

EPO, Communication pursuant to Rules 70(2) and 70a(2) EPC and references to Rule 39(1) EPC, Application No. 13174957.8, dated Jan. 12, 2015, 2 pgs.

PCT, Notification Concerning Availability of the Publication of the International Application, Application No. PCT/CA2014/050622, dated Jan. 8, 2015, 1 pg.

Communication Pursuant to Article 94(4) EPC issued in European Application No. 13174957.4 dated Oct. 24, 2016.

* cited by examiner

MITIGATION OF RADIO INTERFERENCE AND THERMAL ISSUES USING RADIO ACCESS TECHNOLOGY SELECTION

FIELD OF THE DISCLOSURE

The present patent disclosure generally relates to the selection of access technologies and to the mitigation of radio interference and/or thermal issues thereby.

BACKGROUND

As wireless user devices become both smaller and more powerful, numerous issues emerge with regard to management of the user device to provide an optimal user experience. Two of the many issues include radio interference between multiple radios within a wireless device and the management of heat produced by components of the user device.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Proliferating radio technologies and band support has increased the problem of radio frequency (RF) interference between radio technologies in use on a wireless UE device. By way of example a wireless user equipment (UE) device can support four bands operating in Universal Mobile Telecommunications System (UMTS), four bands in Long Term Evolution (LTE), two bands for Global Positioning Systems (GPS), four bands for Global System for Mobile Communications (GSM), and two bands for WiFi, plus additional bands for Bluetooth® and near field communication technologies.

Figure 1:
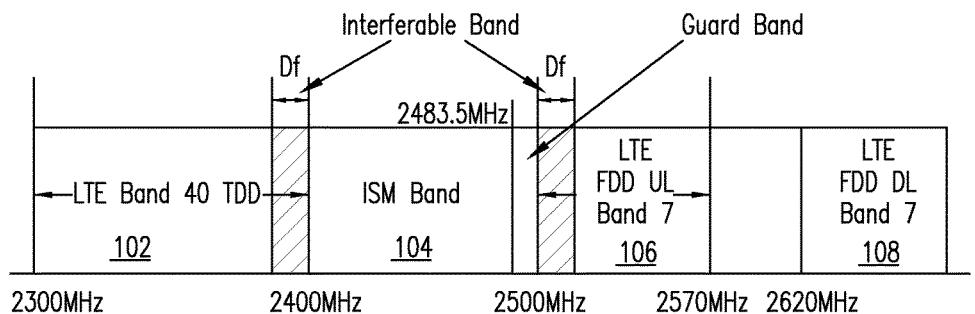
FIG. 1 depicts an example of a region of bandwidth in which the potential for interference is high.

In some circumstances the RF interference between multiple radios on a device is insufficiently managed through lower layer techniques such as filtering and cross-modem scheduling co-ordination. Examples of possible RF interference issues seen between an LTE radio and other radios in a wireless UE device are illustrated in FIG. 1, in which a segment of the radio spectrum between about 2300 MHz and 2700 MHz is illustrated. As shown in this figure, band 102 is assigned to LTE Band 40 Time Division Duplex (TDD) and band 106 is assigned to LTE Band 7 Frequency Division Duplex (FDD) Uplink (UL). These LTE bands are separated by the so-called industrial, scientific and medical (ISM) Band 104. The ISM band was originally designated for industrial, scientific and medical purposes other than communications, including medical devices and microwave ovens and operation in this band is unlicensed. In recent years, the fastest growing use of Band 104 and other ISM bands has been for short-range communication, such as Bluetooth. Within ISM band 104 there are now 79 Bluetooth channels and 14 WiFi channels. The hatched portions of Bands 102 and 106 illustrate regions of these LTE bands that can experience interference from ISM Band 104. In addition to the illustrated regions of the LTE bands that are vulnerable to unregulated communications, LTE Band 13 UL FDD at 777-787 MHz and LTE Band 14 UL FDD at 788-798 MHz (not specifically illustrated) experience interference issues with the global navigation satellite system (GLASS). As the desire for wireless technologies continues to increase and new technologies are developed, new ways to manage such issues are required. From this brief overview, it should be recognized that when a wireless UE device has multiple radios in use, interference issues arise not only from the environment, but also from other radios within the UE device that can operate in adjacent bands. The specific issues that can arise between operations on these adjacent bands include the following:

Adjacent band interference (LTE with ISM):
  Case 1) LTE Band 40 TDD radio transmission causes interference to ISM radio reception;
  Case 2) ISM radio transmission causes interference to LTE Band 40 TDD radio reception;
  Case 3) LTE Band 7 UL FDD radio transmission causes interference to ISM radio reception;

Sub-harmonic frequencies interference (LTE with GNSS):
  Case 4) LTE Band 7/13/14 radio transmission causes interference to GNSS radio reception.

With regard to radio interference mitigation, existing solutions begin with the design phase, i.e., providing good board layout at the physical layer to minimize RF interference and are simply good RF engineering design. Another RF interference avoidance technique is available using signalling layer procedures specified in 3GPP working group RAN2. In the In-Device-Coexistence (IDC) scheme, the wireless UE device uses Radio Resource Control (RRC) signalling to report an interference problem and a suggested solution to the network and the network provides a solution, e.g. Frequency Division Multiplexing (FDM), Time Division Multiplexing (TDM), etc., to the wireless UE device in order to avoid interference. When the FDM solution is available, different radios in the UE device can transmit or receive packets simultaneously because they are allocated to different frequencies that inherently will not interfere. An inter-frequency handover may be required in order to reduce RF interference using this solution. When a TDM solution is offered, different radios in the device can transmit or receive packets in different time periods, which avoids interference even though the frequency bands in which the radios operate may be adjacent to one another.

In addition, the IDC solution allows an LTE-enabled device to perform 'autonomous denial' in order to protect reception of a non-LTE radio, e.g. ISM or GNSS. Once configured by the network, the wireless UE device can autonomously deny UL transmission on adjacent LTE bands to protect the ISM band radio's receiver. Hence autonomous denial may for example involve not utilising uplink LTE scheduling slots that have been allocated in order to protect reception on the ISM band radio. In a similar way the UE may autonomously deny ISM transmissions in order to ensure good connectivity with the eNB, LTE's base station, to perform necessary LTE procedures, e.g., RRC connection reconfiguration and paging reception, etc. A possible disadvantage of the IDC TDM approach is that peak achievable throughputs could be reduced, as scheduling of packets in certain time slots needs to be prohibited in order to manage the RF interference problem.

Each of the described interference mitigation technologies work in the lower layers in the Open System Interconnection (OSI) model and are therefore restricted in the maximum effect that they can have by decisions made at higher layers which concern routing of traffic flows onto the different radio technologies.

In addition to the issues of internal radio interference, another problem that needs to be managed in wireless UE devices is that of thermal control. The temperature of a wireless UE device can become too high if too many radios need to be simultaneously activated. Heat generated by a radio may also be proportionate to the amount of data that it is required to transmit. Since some radios within a UE device may perform better than others from a thermal standpoint there is a need to better manage the activation of radios and the allocation of traffic flows to those radios. Existing mitigation techniques for managing thermal issues include heat dissipation technologies, such as the use of thermally conductive heat dissipating fins, fans, etc., as well as heat reduction technologies, including switching off radios when not in use. A wide variety of well-known battery saving techniques can also yield some additional heat reduction benefits.

In order to understand some of the embodiments of the disclosure provided herein, it is helpful to understand both the meaning of various selection and routing techniques in the context of network telecommunications and some of the standardized traffic routing mechanisms on which work is occurring. Traffic routing is defined, in accordance with 3GPP parlance, as a process that occurs after selection of one or more networks and determines which applications will utilize each access technology, e.g., WLAN2 and Cellular Network B. Network selection is defined as the process of selecting between multiple networks of the same type, e.g. WLAN1, WLAN2, WLAN3. Additionally, selection can be made between different access technologies and frequencies of a single technology family, e.g., 3GPP. This application discloses a method of radio technology and channel selection for transferring device traffic in response to an RF interference or thermal condition. The method can include any or all of traffic routing, network selection or reselection and selection within a technology family. 3GPP currently provides a number of mechanisms by which an operator can control how traffic flows are routed over specific access technologies or networks. The key mechanism is the support of Inter System Routing Policies (ISRP), which is implemented as part of the Access Network Discovery and Selection Function (ANDSF), defined in 3GPP TS 24.312 and provided in the Evolved Packet Core (EPC) of the system architecture evolution for 3GPP-compliant networks. The purpose of the ANDSF is to assist the UE device in discovering non-3GPP access networks, such as Wi-Fi or WIMAX, which can be used for data communications in addition to 3GPP access networks, such as HSPA or LTE, and to provide the UE device with rules policing the connection to these networks. ISRP enables the operator to specify, amongst other things, either:

Which access network should be preferentially used for transmitting traffic flows towards a particular access point name (APN); or Which access network should be preferentially used for transmitting certain IP flows, where an IP flow might for example be described by the combination of source IP address, destination IP address, source port, destination port, and IP protocol type.

Figure 7:
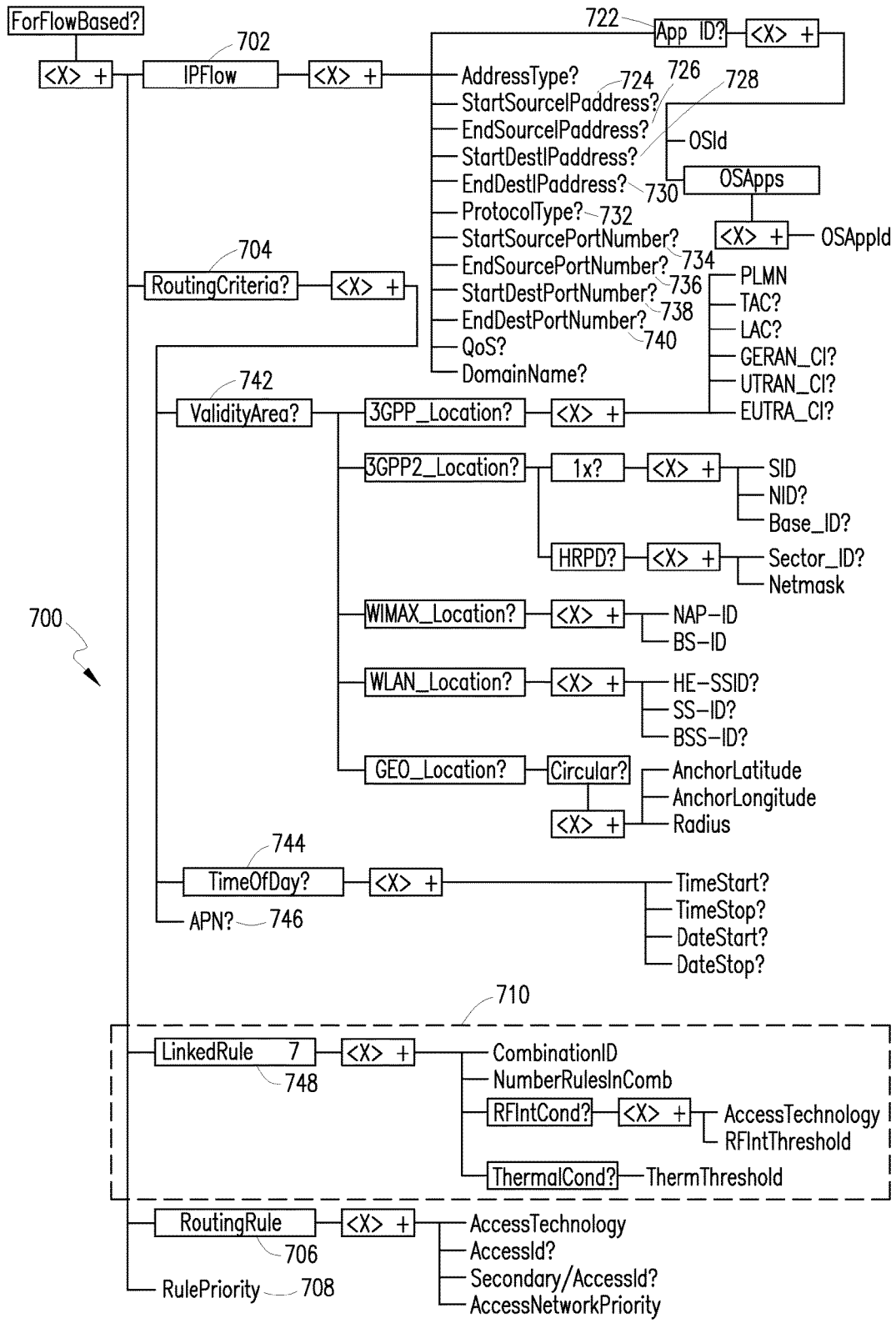
FIG. 7 depicts a modification to the existing management object that the ANDSF can supply to the user equipment device according to an embodiment of the disclosure.

The ANDSF is operable to provide these rules to the wireless UE device using a management object (MO). The MO consists of a set of one or more intersystem mobility policy rules, with only one rule being active at any one time. The rules have a number of conditions under which they become active, e.g. the time of day and location of the UE device. In addition to conditions there is a rule-priority that is set for each rule in order for the UE device to determine which rule should be considered active. If the active rule becomes invalid, i.e. the conditions of the rule are no longer fulfilled or a validity period expires, the UE device is triggered to evaluate whether a new rule should now become active. An example MO is shown in FIG. 7 and will be discussed in greater detail below.

A work item, entitled Data Identification in ANDSF (DIDA) (see SP-110084) is directed to providing improved ways by which applications can be identified. Two approaches to be taken forward include identification by Fully Qualified Domain Name (FQDN) and identification based on Application ID. Another 3GPP work item entitled Operator Policies for IP Interface Selection (OPIIS) (see SP-120260) is concerned with providing the operator with a mechanism for controlling which of possibly multiple IP interfaces should be used for accessing certain access point names (APNs). For example, the 'internet' APN might be reachable by a cellular or by a WLAN supported IP interface.

Currently these traffic routing mechanisms treat the cellular radio as a single access technology, although it can consist of more than one underlying RAT (e.g. GERAN, UTRAN, E-UTRAN, cdma2000, etc.). If the traffic routing mechanism chooses to use cellular radio, then the actual underlying cellular access technology that is used is determined based on the rules and mechanisms of those RATs, e.g. network based handover decisions, cell reselection rules, etc. Current work within the SA2 FS_WORM study will allow the operator to specify whether WLAN is more or less preferred than a specific radio technology. For example, it will be possible to specify that WLAN is more preferable than UMTS but not as preferable as LTE. A UE device cannot autonomously control the RF frequency that the UE device uses on a cellular RAT, since the network controls this. However, the UE device can currently control whether it uses 2.4 GHz WLAN or 5 GHz WLAN, although that may change in the future.

In addition to techniques the standardization organizations are developing for traffic routing, many UE devices in the market contain proprietary methods for determining how specific services get routed over specific radio technologies. For example a simple algorithm that can be included in a device is one which dictates that WiFi is always used in preference to 3GPP when available. However, none of the existing technology or algorithms currently take RF interference or thermal overload conditions within the UE device into account in traffic routing decisions.

The present patent disclosure is broadly directed to taking specific conditions in the UE device into account when determining to route traffic from an application or group of applications to one or more specific radio access technologies. For the purposes of this patent application, a data application running on a UE device can be any application or process that generates or consumes data traffic. However, in at least one embodiment of the disclosure, a method that routes the data traffic can arrange routing for all applications, whether or not the applications are generating or consuming traffic. Reference to a data application in this patent application is considered to refer to an application that generates data, consumes data or both. The conditions that can be taken into account when routing traffic include existing or projected radio interference levels between multiple radios on the UE device and/or thermal conditions within the UE device. For both thermal and RF interference mitigation, embodiments of the disclosed traffic flow decision-making process can be implemented either in the UE device, in the network or using some combination of shared responsibility. Minimization of inter-RAT adjacent channel RF interference levels may also be associated with improvements in throughput, range and/or quality of service. A system and method of the present patent disclosure will now be described with reference to various examples of how the embodiments can best be made and used, wherein the various elements are not necessarily drawn to scale.

Figure 2:
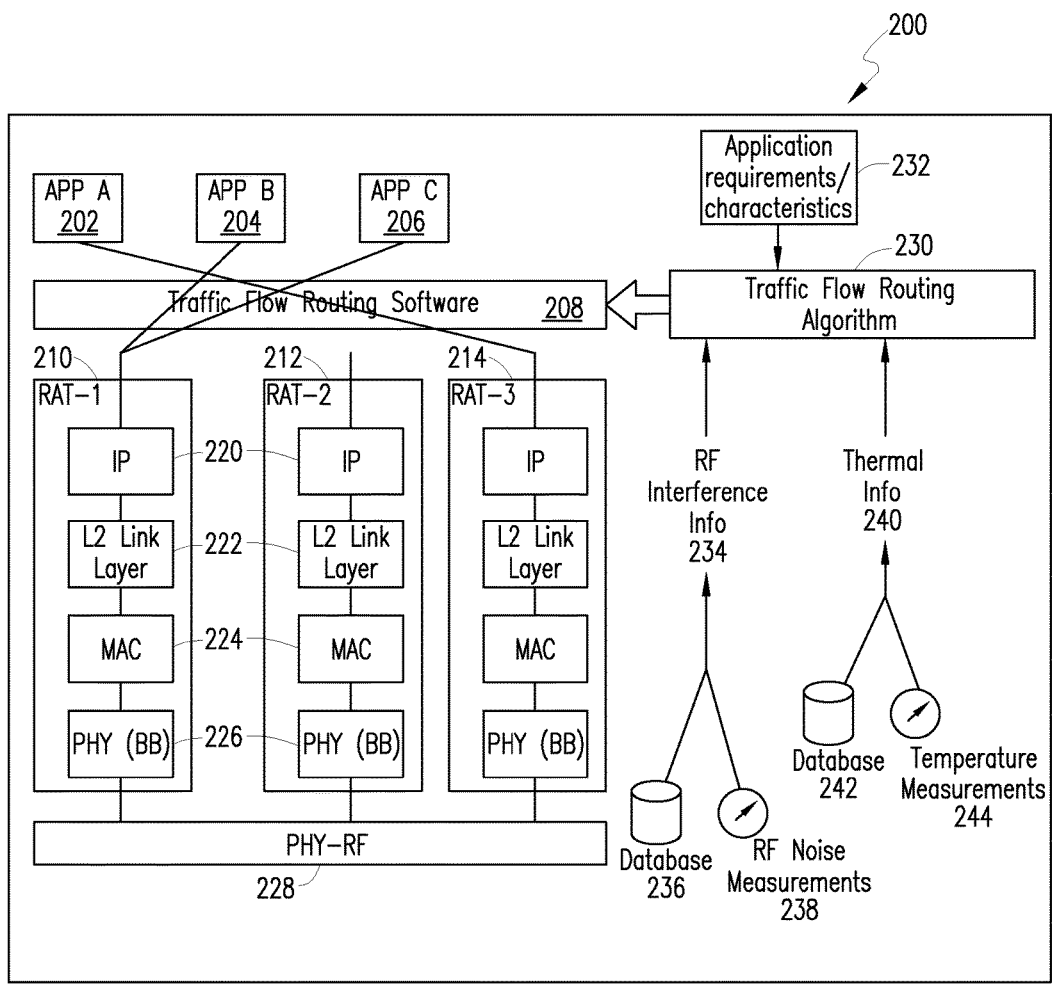
FIG. 2 depicts a software architecture view of a wireless user equipment (UE) device according to one embodiment of the disclosure.

Referring now to the drawings, and more particularly to FIG. 2, a software architectural view of a wireless user equipment device 200 operable for associating user applications with optimal radio access technologies according to any existing or predicted RF interference and/or thermal issues is shown according to one embodiment. Applications operating on the UE device are represented in this drawing by applications 202, 204, 206, which may be, for example, email, calendar/scheduler, contact management, web browser, a positioning application such as GPS, or any application that requires wireless communication capabilities. The radio access technologies (RATs) supported on the wireless UE device are represented by three examples, 210, 212, 214, and can be any combination of known or heretofore unknown radio access technologies and network protocols. For instance, the RATs may comprise any of IEEE 802.11 technology, GSM/EDGE Radio Access Network (GERAN) technology, Universal Mobile Telecommunications System (UMTS) technology, Evolution—Data Optimized (EVDO) technology, Code Division Multiple Access (CDMA) technology, Time Division Multiple Access (TDMA) technology, Long-Term Evolution (LTE) technology, HiperLan technology, HiperLan II technology, WiMAX technology, OpenAir technology, Bluetooth technology, and GPS technology. Each of RATs 210, 212, 214 requires a suite of protocols for communication. As shown in this figure, each of RATs 210, 212, 214 includes protocols to manage the various layers defined by the Open System Interconnection (OSI) model, such as network (IP) protocols, L2 link layer protocols, Media Access Control (MAC) protocols and Physical layer protocols. In the particular embodiment shown in this figure, traffic flow routing software 208 can match traffic from applications 202, 204, 206 with appropriate radio access technologies 210, 212, 214 where each of those RATs is associated with a different IP interface 220. The figure exemplifies a situation in which some traffic is directed toward a WLAN using an IP address that has been locally assigned by the WLAN in a process called non-seamless wireless offload (NSWO), while at the same time other traffic is routed toward the 3GPP core network (CN) using an IP address assigned for one of the public data networks (PDNs) or access point names (APNs) into which the 3GPP CN provides connectivity. In an alternate embodiment, a single IP address may be utilized across multiple RATs. By way of example an IP address could be assigned by the 3GPP network, with this IP address used when conveying traffic over either WLAN or cellular networks. An example of using a single IP address across multiple RATs occurs during 3GPP-WLAN mobility, in which WLAN traffic is routed to the 3GPP core network in order to benefit from IP session continuity. In this alternate embodiment, IP protocol 220 would logically reside above the individual RATs 210, 212, 214. Hybrids of these two embodiments can also utilize the disclosed mitigation techniques.

Continuing to look at FIG. 2, traffic flow routing software 208 receives requests for connections from applications 202, 204, 206 and determines an optimal routing for the traffic, matching each application to an associated radio access technology 210, 212, 214. Traffic flow routing software 208 receives information from traffic flow routing algorithm 230, examples of which are discussed in greater detail below. Traffic flow routing algorithm 230 takes knowledge of actual or projected in-device inter-system RF interference and/or thermal conditions into account in determining how traffic flows from each application should be routed over appropriate radio access technologies. Traffic flow routing algorithm 230 receives information regarding the requirements and characteristics 232 for each application residing on the wireless UE device and also receives information regarding RF interference 234 and/or thermal information 240. Although the embodiment shown in this figure receives both RF interference information and thermal information, this combination is not necessary to practice the disclosure. The disclosed embodiments can receive only RF interference information 234, only thermal information 240, or both. RF interference information 234 can include RF interference measurements 238 made by the wireless UE device, as well as information from database 236, which can include projected RF interference from stored information. Similarly, thermal information 240 can include temperature measurements 244 made by the wireless UE device, as well as information from database 242, which can include projected temperatures from stored information.

In the case of the RF interference problem, the algorithm may take into account actual measurements of RF interference, for example by measuring received interference levels on a RAT receiver. The measurements may be undertaken in such a way that exploits any internal coordination functionalities that exist between different radios in the device. For example, if a communication link exists between an ISM device and an LTE device then, when the LTE device is making an RF interference measurement it can be informed of whether the ISM band device was communicating at the time of the measurement and if so at what levels, providing more meaningful measurements. In another variation, projected RF interference levels may be estimated based on device transmit power measurements and database-configured inter-system RF coupling figures.

In the case of the thermal load problem, the algorithm can be driven by actual device temperature measurements. However, other methods for predicting thermal problems may also be available, e.g., using pre-configured lab measurements of temperature recorded as a function of number of radios active, the period of time that radios have been active, ambient temperature etc.

This information can then be used in determining whether some alternative mapping of traffic flows to RATs is required. Actions might involve moving all flows from one radio to another in order that a particular radio can be switched off, thereby completely avoiding RF interference or thermal contribution from that radio. Alternatively the data rate on a particular radio may be reduced, e.g., by re-routing a sub-set of services off of that radio. To the extent that RF interference and thermal load are proportional to data rate carried on a particular radio, the contribution to RF interference and/or thermal load of that radio would then be reduced.

The decision on preferred mappings can be taken on an event triggered basis, e.g. when requests for new traffic flows are received, when new radio access technologies or access networks become available, when the characteristics of an access technology or access network change or when RF interference or thermal load becomes unacceptable. Such a change in the characteristics of a radio access technology or network can occur, for example, during handover or cell reselection, which may mean a change to the underlying access technology that is being used (e.g. E-UTRA to UTRA) or the carrier frequency that is being used.

Figure 3:
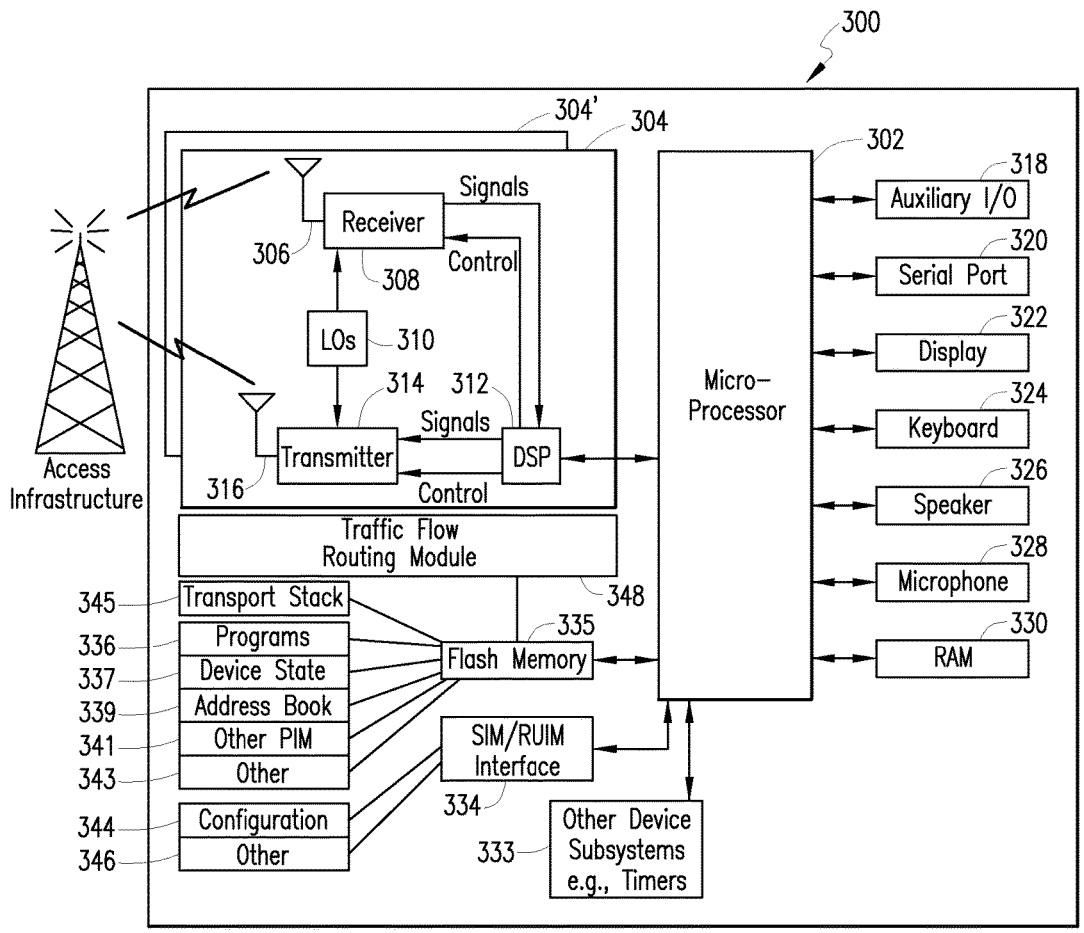
FIG. 3 depicts a wireless UE device according to an embodiment of the disclosure.

FIG. 3 depicts a block diagram of an embodiment of a communication device 300 operable as a wireless UE device for purposes of the present patent disclosure. A microprocessor 302 providing for the overall control of an embodiment of the UE device is operably coupled to communication subsystem 304 that is capable of operation on multiple bands and in multiple access technologies as necessary. The communication subsystem 304 generally includes one or more receivers 308 and one or more transmitters 314 as well as associated components such as one or more local oscillator (LO) modules 310 and a processing module such as a digital signal processor (DSP) 312. As will be apparent to those skilled in the field of communication, the particular design of communication module 304 may be dependent upon the bands and access technologies with which the mobile device is intended to operate (e.g., CDMA, GSM, WLAN, LTE-A, et cetera). Regardless of the particular design, however, signals received by antenna 306 through appropriate access infrastructure are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 312, and provided to transmitter 314 for digital-to-analog (D/A) conversion, frequency up conversion, filtering, amplification and transmission over the air-radio interface via antenna 316. In the disclosed embodiment, mobile communication device 300 is able to operate on several bands simultaneously and may have the capability to operate using multiple-inputs, multiple-outputs (MIMO). Some implementations may also include multiple antennae for improved performance using techniques such as diversity.

Microprocessor 302 may also interface with further device subsystems such as auxiliary input/output (I/O) 318, serial port 320, display 322, keyboard/keypad 324, speaker 326, microphone 328, random access memory (RAM) 330 and any other device subsystems, e.g., timer mechanisms, generally labeled as reference numeral 333. To control access, an interface 334 may also be provided in communication with the microprocessor 302 with respect to a removable storage module (Universal/Subscriber Identity Module (U/SIM) or Removable User Identity Module (RUIM)). In one implementation, U/SIM or RUIM interface 334 may be operable with a U/SIM or RUIM card having a number of key configurations 344 and other information 346 such as default content disposition profiles, policy managers, alternative network information, as well as identification and subscriber-related data that may supplement local storage-based information.

Operating system software and applicable service logic software may be embodied in a persistent storage module (i.e., non-volatile storage) such as Flash memory 335. In one implementation, Flash memory 335 may be segregated into different areas, e.g., storage area for computer programs 336 (e.g., service processing logic), as well as data storage regions such as device state 337, address book 339, other personal information manager (PIM) data 341, and other data storage areas generally labeled as reference numeral 343. In addition, a module for traffic flow routing software 348 is provided for facilitating one or more embodiments as set forth in detail herein. Module 348 is shown as a single module in this embodiment, although the functions of traffic flow routing can also be embodied in multiple modules. Selection of a RAT may also be shared between module 348 and a corresponding module or modules in either the radio access network or the core network. It will be recognized by those skilled in the art that although embodiments of this disclosure may comprise an arrangement similar to the wireless UE device shown in FIG. 3, there can be a number of variations and modifications, in hardware, software or firmware, with respect to the various modules depicted. Accordingly, the arrangements shown in this figure should be taken as illustrative rather than limiting with respect to the embodiments of the present patent disclosure.

Figure 4:
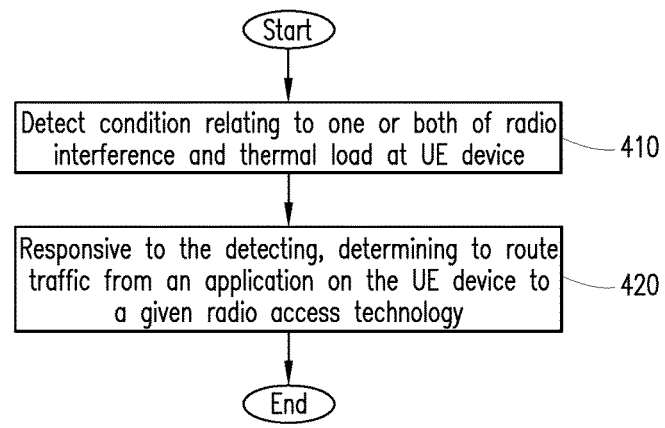
FIG. 4 depicts a flowchart showing a high-level overview of the disclosed method whereby one or more embodiments of the present patent disclosure may be practiced.

Looking now at FIG. 4, an overview of the disclosed method is shown at the highest level. When the algorithm is started, the UE device detects 410 a condition that relates to one or both of radio interference and thermal load at the UE device. Responsive to detecting the condition, a determination is made 420 to route traffic from an application on the UE device to a given radio access technology. Although this flow is shown as a single event that is triggered by detection of a condition, some embodiments may iteratively check conditions on the UE device to determine whether a condition has improved or worsened and responds accordingly. Unlike current situations in which traffic is not changed from one RAT to another unless coverage is lost, selection or reselection of a RAT can be triggered by changes in existing conditions. A number of embodiments are disclosed herein providing various embodiments for managing RF interference and thermal issues due to radio usage are disclosed. These embodiments are discussed in detail below and include:

The routing decision is made purely in the wireless UE device;
The routing decision is made by the core network using event triggered involvement of the ANDSF server;
The routing decision between cellular technologies is made by the radio access network but using information provided by the UE device;
The routing decision is determined by the core network using pre-configured combinatorial ANDSF rules provided to the wireless UE device; and
The routing decision is made by the wireless UE device but within boundaries set by the core network.

It is notable that both temperature and RF interference between radios on a single device can be dependent on the specific design of the wireless UE device. Given the number of UE devices offered, networks face a huge problem in determining rules that will provide an appropriate response for all wireless UE devices.

In a first embodiment, the traffic flow routing decisions are made purely in the wireless UE device. As noted previously, the mobile UE device is not enabled to make a unilateral decision to re-route traffic between the underlying radio access technologies of the cellular radio system, since the network controls handover. Additionally, the standards specifications define rules within which the wireless UE device must operate during cell reselection. However, the wireless UE device is operable to make a unilateral decision whether to route traffic over a wireless local area network (WLAN) or a cellular network. This capability may change however, if the ANDSF is implemented in the device and in the network, which may limit the scope of freedom afforded to the UE device by the network. Where the traffic routing decision is made in the wireless UE device, the device can trigger access network selection and/or bearer re-routing signaling with the network. If conditions on the wireless UE device change, the selection of RATS can be retriggered.

In a second embodiment, the routing decision is made by the network, but relies on the UE device to trigger involvement of the ANDSF server in response to detecting a condition. In this embodiment, the UE device detects a condition relating to either RF interference or thermal control and sends a request to the ANDSF server. The request can provide information to the ANDSF that includes measured or projected RF interference and/or measured or projected thermal load and may provide recommendations for re-routing the traffic associated with the UE device, based on the UE device's knowledge about the internal RF environment or thermal load. The traffic flow routing algorithm at the ANDSF is enabled to invoke signaling that moves bearers from one system to another, i.e., cellular to WLAN or WLAN to cellular, on an event-triggered basis. Like the UE device, the ANDSF is not enabled to control routing of traffic flows between different cellular access technologies, as this ability is managed at lower layers in the network. The ANDSF can, for example, push a new management object (MO) to the UE device. As noted earlier, the management object is a means by which the ANDSF can provide rules for the UE device to use in the selection of appropriate access networks and is discussed in greater detail in a later embodiment.

Figure 5:
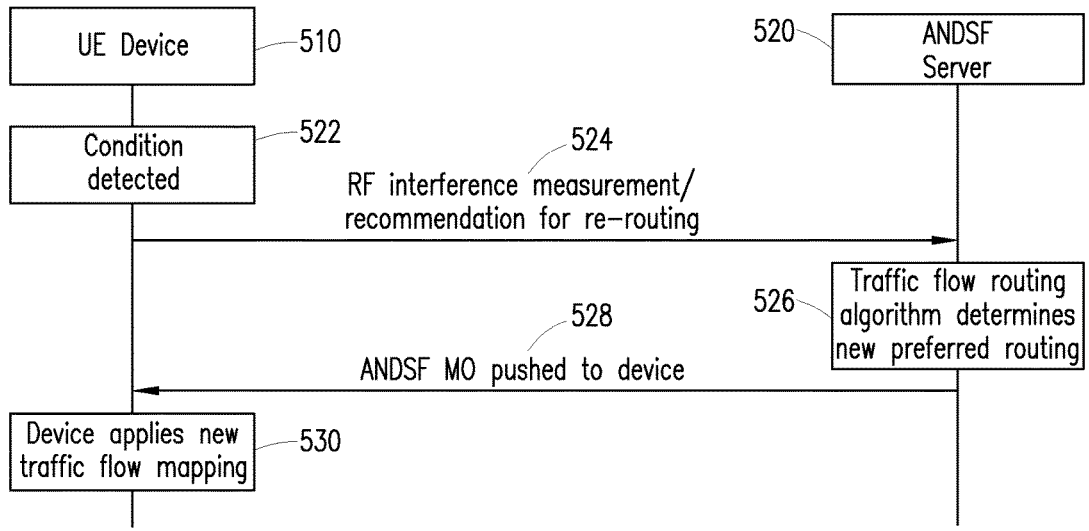
FIG. 5 depicts signaling between the wireless UE device and network in an event triggered, network-controlled method according to one embodiment.

FIG. 5 depicts signaling between UE device 510 and ANDSF server 520 in the network in an event triggered, network-controlled method according to this embodiment. The process begins with detection of a condition 522, such as the conditions discussed with regard to FIG. 4. Once the condition is detected, UE device 510 sends a message 524 to ANDSF server 520. Existing ANDSF 'pull' signaling, which the UE device can use to request policy information from the ANDSF server, can be used to convey the information in the uplink direction between UE device 510 and ANDSF server 520. The types of information that the device can send to the ANDSF server may include the following:

The preferred access technology, with or without specifying a reason, such as reducing thermal level and/or RF interference. In at least some embodiments, the UE device can specify the preferred network, e.g., for WLAN;

| Preferred Access Technology/Network | Reason |
| --- | --- |
| WLAN | Thermal and/or interference |
| Cellular | Thermal and/or interference |

The interference level of each access technology and in some embodiments, of a specific WLAN network. In this case, the network may direct traffic to the most appropriate access technology based on information reported by the UE device.

| Access Technology/Network | Interference level |
| --- | --- |
| WLAN | XXX |
| Cellular | YYY |

When ANDSF 520 receives message 524, the embodiment of the traffic flow algorithm at the ANDSF determines 526 a new preferred routing. The ANDSF then pushes 528 a new management object to UE device 510, providing new traffic flow mappings that allow the UE device to make an improved selection. When UE device 510 receives the management object, the UE device applies 530 the new traffic flow mappings and proceeds.

In a third embodiment, the final routing decision between cellular technologies is made by the radio access network but using information provided by the UE device. For example, the UE device can provide an indication to the cellular network that a 3GPP inter-RAT handover is recommended, with an indication that the reason for this request is thermal overload or excessive RF interference. The device can recommend a target radio access technology or a target radio access frequency or a target radio access frequency band. The request message can also include radio measurements that the UE device has made on the target radio access technology or frequency or frequency band. This messaging is carried using radio resources (RR)/radio resource control (RRC) signaling. For example, the RAN (GERAN, UTRAN or LTE) can be enabled to send a Measurement Control message to the device requesting that the UE device trigger the sending of a Measurement Report in the event that thermal load or RF interference becomes unacceptable. The types of signaling that the UE device can send to the current 3GPP RAN controller may include the following:

The preferred radio access technology or frequency or frequency band with or without a reason, e.g. reducing thermal level and/or RF interference. In at least some embodiments, the UE device can provide a specific network;

| Preferred Access Technology/Network | Reason |
| --- | --- |
| Preference 1: RAT X | Thermal and/or interference |
| Preference 2: RAT Y | Thermal and/or interference |
| Preference 3: RAT Z | Thermal and/or interference |

Interference level of each access technology, in this case, the network may direct traffic to the most appropriate access technology based on information reported by the UE device. In at least some embodiments, the UE device can provide a specific network.

| Access Technology/Network | Interference level |
| --- | --- |
| RAT 1 | XXX |
| RAT 2 | YYY |
| RAT 3 | ZZZ |

Figure 6:
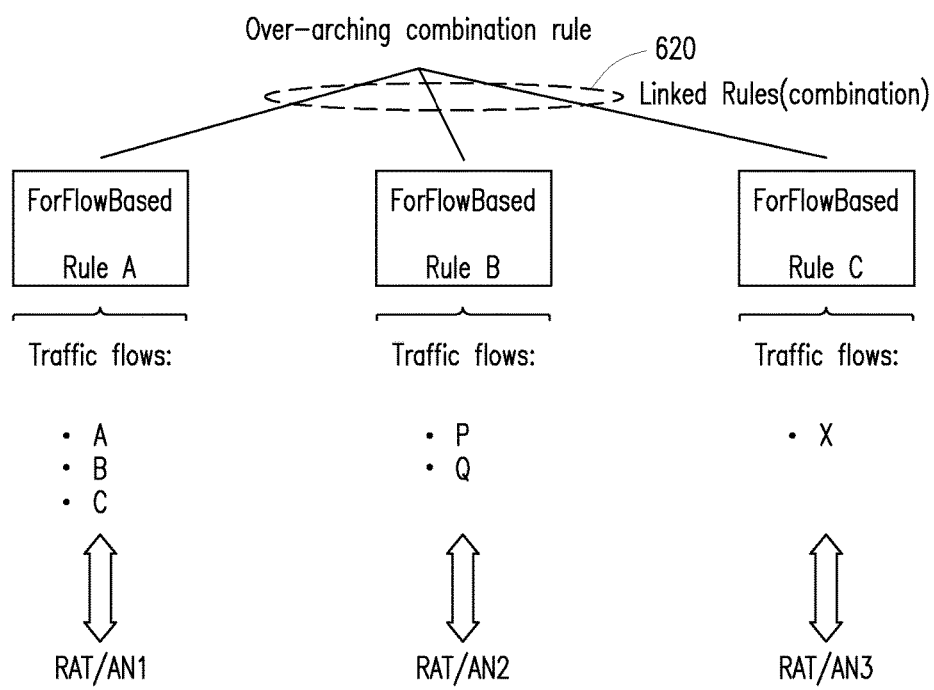
FIG. 6 depicts a rule-based conception of allocating a combination of applications to respective radio access technologies according to an embodiment of the disclosure.

In a fourth embodiment, the routing decision is determined by the network, but through pre-configured combinatorial ANDSF rules provided to the UE devices. In this embodiment, the UE device is pre-configured with rules that specify that specific combinations of traffic flows should be supported on respective combinations of radio access technologies. As noted earlier, the network is currently operable to support a preferred mapping by pushing a management object to the UE device at any time; however combinations of multiple radio access technologies are not currently addressed by this methodology. The embodiment described herein introduces the concept of 'linked rules', wherein an over-arching combination rule consists of multiple ANDSF ForFlowBased rules. The number of sub-rules (ForFlowBased rules) in the combination is determined by the number of radio access technologies or access networks that are active in the combination. An example of a combination rule is shown in FIG. 6. In the specific embodiment illustrated in this figure, Rule A includes traffic flows A, B, C, which are mapped to a first radio access technology/access network, RAT/AN 1. Similarly, Rule B includes traffic flows P, Q, which are mapped to RAT/AN 2, and Rule C includes traffic flow X, which is mapped to RAT/AN 3. As shown by the dotted line 620, these three rules are linked together to create a single overarching combination rule.

An example of changes that could be made to the existing ANDSF MO ISRP rules in order to support the linked rule concept is shown in FIG. 7, which illustrates the organization of the ForFlowBased MOs. The portion of this figure enclosed by dotted lines 710 is not currently part of management object 700, but is provided to illustrate this additional capability. As shown, management object 700 contains nodes for IP Flow 702, Routing Criteria 704, Routing Rule 706, and Rule Priority 708. The IP Flow identifies the type of information that is to be sent or received and can be identified, for example, by application ID 722 or by the combination of a source IP address 724, 726 (i.e., a range of IP addresses can be indicated), destination IP address 728, 730, source port number 734, 736, destination port number 738, 740, and protocol type 732. Routing Criteria 704 provides the criteria that must be met for the rule to be active, which can include the availability of specific RATs in identified areas of validity 742, time of day limitations 744, and specific access point names (APNs) 746 to be reached. Routing Rule 706 identifies the preferred access technology and may also provide alternate access technologies that are used if the preferred access technology is not available. Rule Priority 708 specifies where this rule is in the hierarchy of rules. The following table explains the new ANDSF ISRP MO elements, including LinkedRule 748:

| Element name | Explanation |
|---|---|
| LinkedRule? | If present then this node indicates that:<br>a) The rule is only active when all linked rules are also active.<br>b) All listed IP flows (listed under IP flow element) have to be present |
| <X>+ | Elements to the right of this node can be duplicated multiple times. The intent here is that the defined mapping of a given set of IP flows to a particular AN/RAT may be of interest in the definition of multiple different combinations (multiple sets of linked rules). |
| CombinationID | This is a unique identifier for the overarching combination rule. It can be used by the device (along with NumberRulesInComb, see below) to determine which other ForFlowBased rules need to be active in order for this rule to be active |
| NumberRulesInComb | This informs the device how many ForFlowBasedRules in total are needed to specify the combination. In effect it specifies the number of RAT's/AN's that are relevant for the combination. |
| RFIntCond? | This is a validity condition for the rule. If present it means that the rule can only become active when an RF interference condition is true. If not present it means that the rule is valid irrespective of the RF interference conditions. |
| AccessTechnology | This indicates the AccessTechnology which must be experiencing the high RF interference condition, in order for the rule to become active. It may be that more than one RAT should be experiencing an RF interference condition in order for the rule to become activated (this is indicated by the preceding <X>+). If more than one set of RATs is provided in the MO then all of these RATs must be receiving unacceptable levels of RF interference in order for the rule to become active. |
| RFIntThreshold | An RF interference threshold that has to be experienced or exceeded on that RAT/AN technology in order for the rule to become valid. |
| ThermalCond? | If present it means that the rule can only become valid when the device is in thermal overload |
| ThermThreshold | This defines the threshold (e.g., thermal alarm level) at which the rule will become active |

With reference to the fourth embodiment above, it can be very difficult for the network to define interference thresholds or thermal thresholds that are appropriate for every device, since the thresholds where some rerouting action needs to be taken are likely to be very dependent on the individual device implementation. In a fifth embodiment, the wireless UE device receives management objects from the ANDSF, but is empowered to override ANDSF-provided rules in cases of radio interference or thermal conditions. For example, the ANDSF-provided rules can include an indication of specific rules that are allowed to be overridden in the event of RF interference or thermal overload problems. Alternatively, a priority level might be associated with each ANDSF rule, with the device enabled to choose the order with which it overrides ANDSF rules according to this priority when it becomes necessary to resolve an RF interference or thermal load problem.

A number of embodiments of managing radio interference and/or thermal issues at higher layers of the OSI model have been disclosed. Additionally, a number of variations can be applied to these disclosed embodiments, as will be shown. For example, traffic routing algorithm 230 may optionally be applied only if all lower layer options, e.g., at the PHY and MAC layers, have been exhausted and further mitigation is required. Additionally or alternatively, traffic routing algorithm 230 may be used to pre-emptively reduce the occurrence of scenarios leading to radio interference or thermal overload. In one example of this variation, a wireless UE device can maintain or receive from an operator, a history of RF interferences or thermal issues related to the specific configuration of the UE device. Such a history can be used to predict possible issues and request or institute changes proactively. In a further alternative, if an optimal route for an application is unavailable at the time the application is launched, when a more preferable route, e.g., the desired RAT/AN, does become available, then the traffic routing can be changed, leading to reduced interference and/or improved thermal conditions. In a still further variation, there are a variety of ways by which a UE device or the network can identify traffic flows of different types. For example, traffic types can be delineated according to the volume of traffic that they will generate and hence the level of RF interference or thermal load that they might consequently cause. Traffic flows can be categorized according to whether they are streaming, background, conversational-video, conversational voice etc. In one approach using this variation, knowledge based on the Fully Qualified Domain Name (FQDN), such as whether or not the traffic flow is from YouTube can be used. Other approaches can use the IP 5 tuple (source/destination address, source/destination port number and protocol type) or operating system (OS)-specific application ID's, as mentioned in the description of management object 700. In another variation, a measurement of the UE device's transmit power level, as opposed to an RF interference level measurement, can be used to invoke a traffic re-routing. This can be effective because the UE device transmit power on RAT A can be a key determinant of RF interference levels on a RAT B receiver. The transmit power level can be used in conjunction with a predetermined, e.g., database stored, inter-RAT RF coupling value in order to determine the projected receive RF interference level.

Several example cases that use the disclosed method now follow. Case A starts with an application appA using a cellular default route in good coverage. At this point in time the cellular radio is using upper band of Band 40 LTE. The user then enters an office and opens other corporate applications that utilize a lower channel of WiFi A (2.4 GHz band) in the adjacent ISM band. The cellular bearer starts suffering from poor in-building coverage. This causes the LTE uplink power to be increased, which in turn causes interference to WiFi. LTE throughput goes down and WiFi performance is also adversely affected. It would be efficient at this point to switch other applications to WiFi B (5 GHz) or to route appA to WiFi B so that applications that MUST use the cellular route, e.g. a carrier application, can meet their throughput needs whilst simultaneously minimizing interference.

In Case B, a mapping application, e.g., Google maps, may use either LTE or WiFi whilst simultaneously using the GPS receiver. If LTE traffic routing is known to cause interference on the GPS receiver, then it is preferable for the mapping application to be run using WiFi, so that a more accurate GPS location reading can be obtained. It is noteworthy that some signaling is used for GPS at the very initial stage for setup, after that GPS may need signaling information rarely. Accordingly, interference from LTE to the GPS system may only be of concern for a limited time period.

In Case C, the device is operating in an upper band of Band 40 LTE when the device experiences interference that affects throughput. This can cause the device to trigger a Measurement Report to the E-UTRAN requesting that it is handed over to a different 3GPP radio access technology, e.g., UMTS. The device may additionally indicate that the request is due to interference. The E-UTRAN then commands the device to perform the handover to UMTS. After the handover, all applications with their traffic routed over cellular are carried on UMTS that is not subject to the throughput impacting interference. Alternatively the device can request that it is handed over to a different frequency within LTE, e.g. a frequency within the 1800 MHz band. The E-UTRAN then commands the device to perform the handover to a carrier frequency in the requested 1800 MHz band. After the handover, all applications with their traffic routed over cellular, are now carried on the same radio access technology but within a different frequency band that is not subject to the interference.

In one aspect, an embodiment of a method of radio technology and channel selection for transferring device traffic is disclosed. The disclosed method includes detecting, at a wireless user equipment device, a condition related to at least one of temperature and radio interference; and responsive to the detecting, determining to associate a data application on the wireless UE device with a radio access technology (RAT).

In another aspect, an embodiment of a wireless user equipment device is disclosed. The disclosed wireless user equipment device includes: a micro-processor operably coupled to a communication subsystem and a memory; a first module operable to detect a condition related to at least one of temperature and radio interference; and a second module operable to associate a data application on the wireless UE device with a radio access technology in response to detecting the condition; wherein the modules comprise one of hardware, firmware and software stored in the memory.

It will be recognized by those skilled in the art upon reference hereto that although embodiments of this disclosure may comprise an arrangement similar to the specific embodiments described herein and as particularly shown in the attached figures, a number of variations and modifications will be apparent to persons skilled in the art. Accordingly, the embodiments disclosed should be taken as illustrative rather than limiting.

What is claimed is:

1. A method of radio technology and channel selection for transferring device traffic comprising:
   detecting, at a wireless user equipment (UE) device, a condition caused by radio interference between multiple radios in the wireless UE device;
   responsive to the detecting, sending a message from the wireless UE device to a network node using a first radio access technology (RAT) operating on a first frequency, wherein the message indicates the detected condition and a preferred second RAT or a preferred second frequency, the preferred second RAT is different than the first RAT, the preferred second frequency is different than the first frequency, and the first RAT and first frequency provide connectivity to the wireless UE device prior to detecting the condition;
   receiving a response message from the network node, the response message instructing the wireless UE device to transfer device traffic to the preferred second RAT or to transfer the device traffic to the preferred second frequency; and
   in response to receiving the response message, transferring the device traffic for a data application on the wireless UE device to the preferred second RAT or transferring the device traffic for the data application on the wireless UE device to the preferred second frequency.

2. The method of claim 1, wherein the condition comprises the wireless UE device experiencing radio interference in a given access technology that is greater than a threshold value.

3. The method of claim 1, wherein the condition further comprises one of opening an application or closing an application on the wireless UE device, the application requiring data transfer via a radio access technology.

4. The method of claim 1, wherein the condition further comprises one of moving into a coverage area or moving out of a coverage area for a given radio access technology.

5. The method of claim 1, further comprising receiving a measurement of a level of radio interference for the wireless user equipment (UE) device.

6. The method of claim 1, wherein responsive to the detecting, the data application is moved from an association with a first one of a group consisting of a wireless local area network and a wide area cellular network to an association with a different one of the group.

7. The method of claim 1, further comprising receiving, at the wireless UE device, a management object comprising at least one traffic routing rule.

8. The method of claim 7, wherein the management object is received responsive to signaling a network node regarding the condition.

9. The method of claim 7, wherein the wireless UE device is operable to override a subset of the at least one traffic routing rule.

10. The method of claim 9, wherein the wireless UE device is operable to override the subset of the at least one traffic routing rule based on an override priority of each traffic routing rule in the subset.

11. The method of claim 1, further comprising transferring device traffic for the data application to a radio access technology that is different than the preferred second RAT responsive to a new condition.

12. A wireless user equipment (UE) device, comprising:
a memory; and
at least one hardware processor communicatively coupled with the memory and configured to:
detect a condition caused by radio interference between multiple radios in the wireless UE device;
in response to detecting, send a message to a network node using a first radio access technology (RAT) operating on a first frequency, wherein the message indicates the detected condition and a preferred second RAT or a preferred second frequency, the preferred second RAT is different than the first RAT, the preferred second frequency is different than the first frequency, and the first RAT and first frequency provide connectivity to the wireless UE device prior to detecting the condition;
receive a response message from the network node, the response message instructing the wireless UE device to transfer device traffic to the preferred second RAT or to transfer the device traffic to the preferred second frequency; and
in response to receiving the response message, transfer the device traffic for a data application on the wireless UE device to the preferred second RAT or transferring the device traffic for the data application on the wireless UE device to the preferred second frequency.

13. The wireless UE device of claim 12, the at least one hardware processor further configured to receive a management object comprising at least one traffic routing rule.

14. The wireless UE device of claim 13, the at least one hardware processor further configured to override a subset of the at least one traffic routing rule.

15. The wireless UE device of claim 14, the at least one hardware processor further configured to determine an order in which to override the subset of the at least one traffic routing rule based on an override priority assigned to each rule of the subset.

16. The wireless UE device of claim 13, wherein the management object contains at least one set of linked traffic routing rules.

17. The wireless UE device of claim 12, the at least one hardware processor further configured to transfer device traffic for the data application to a radio access technology that is different than the preferred second RAT responsive to a new condition.

* * * * *